(12) United States Patent
Wang et al.

(10) Patent No.: US 9,145,128 B2
(45) Date of Patent: Sep. 29, 2015

(54) COORDINATING REGENATIVE BRAKING WITH TORQUE CONVERTER CLUTCH OPERATION

(71) Applicant: FORD GLOBAL TECHNOLOGIES, LLC, Dearborn, MI (US)

(72) Inventors: Xiaoyong Wang, Novi, MI (US); Mark S. Yamazaki, Canton, MI (US); Wei Liang, Farmington Hills, MI (US); Rajit Johri, Ann Arbor, MI (US); Ryan A. McGee, Ann Arbor, MI (US); Ming L. Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 126 days.

(21) Appl. No.: 14/053,914

(22) Filed: Oct. 15, 2013

(65) Prior Publication Data

US 2015/0105214 A1 Apr. 16, 2015

(51) Int. Cl.
*B60W 10/192* (2012.01)
*B60W 10/02* (2006.01)
*B60W 20/00* (2006.01)

(52) U.S. Cl.
CPC ............ *B60W 10/192* (2013.01); *B60W 10/023* (2013.01); *B60W 20/108* (2013.01); *B60W 2510/08* (2013.01); *B60W 2510/18* (2013.01)

(58) Field of Classification Search
CPC ............ B60W 10/192; B60W 20/108; B60W 10/023; B60W 2510/18; B60W 2510/08; B60K 41/02; F16H 61/14

USPC .......................................................... 477/171
See application file for complete search history.

(56) References Cited

U.S. PATENT DOCUMENTS

| | | | |
|---|---|---|---|
| 6,183,389 B1 | 2/2001 | Tabata | |
| 6,254,507 B1 | 7/2001 | Downs | |
| 6,805,211 B2 | 10/2004 | Fujikawa | |
| 6,835,160 B2 | 12/2004 | Kitano et al. | |
| 6,846,265 B2 | 1/2005 | Yamamoto et al. | |
| 7,055,635 B2 | 6/2006 | Itoh et al. | |
| 7,100,720 B2 | 9/2006 | Ishikawa | |
| 7,243,010 B2 | 7/2007 | Tabata et al. | |
| 7,329,204 B2 | 2/2008 | Senda et al. | |
| 7,637,842 B2 | 12/2009 | Tamai et al. | |
| 8,544,577 B2 * | 10/2013 | Kitano et al. | 180/65.285 |
| 8,718,879 B2 * | 5/2014 | Takahashi et al. | 701/50 |
| 2001/0000338 A1 * | 4/2001 | IIjima | 477/62 |

* cited by examiner

*Primary Examiner* — David J Hlavka
(74) *Attorney, Agent, or Firm* — David B. Kelley; MacMillan, Sobanski & Todd, LLC

(57) ABSTRACT

A method for controlling a vehicle regenerative braking event includes maintaining a converter clutch closed while braking, while an engine connected to the impeller is running, opening the converter clutch when impeller speed reaches a reference speed difference relative to engine idle speed, and while the engine is off, opening the converter clutch when impeller speed reaches a speed required for a transmission pump, connected to an impeller, to produce line pressure at a desired magnitude.

12 Claims, 4 Drawing Sheets

COORDINATING REGENERATIVE BRAKING WITH TORQUE CONVERTER CLUTCH OPERATION

BACKGROUND OF THE INVENTION

1. Field of the Invention

This invention relates generally to a method for controlling a regenerative braking event in a hybrid electric vehicle by changing the torque capacity of a torque converter lock-up clutch.

2. Description of the Prior Art

The fuel economy benefit in a hybrid electric vehicle results mainly from its ability to perform regenerative braking. In a hybrid electric powertrain an electric machine is coupled to the wheels through a torque converter and transmission gearing. The torque converter transmits torque through the combination of the hydraulic path and the mechanic path, provided the torque converter clutch is slipping. If the torque converter clutch is fully open, torque can only be transmitted through the hydraulic path. If the clutch is fully locked, the torque can only be transmitted through the mechanical path.

During regenerative braking, torque is transmitted from the vehicle wheels to the electric machine. If clutch is open, the torque converter's ability to transmit torque in the reverse direction is very limited. Any excessive regenerative torque can reduce the electric machine's speed. As a result, to recoup most of the kinetic energy using regenerative braking, the torque converter clutch should be kept locked while the vehicle is slowing down.

The torque converter clutch, however, must be opened for various reasons. When impeller speed is low, that clutch must be open so that the engine does not stall. When the clutch is open, the hydraulic path serves as coupling to deliver torque smoothly to the wheels.

SUMMARY OF THE INVENTION

A method for controlling a regenerative braking event in a hybrid electric vehicle includes maintaining a converter clutch closed while braking, while an engine connected to the impeller is running, opening the converter clutch when impeller speed reaches a reference speed difference relative to engine idle speed, and while the engine is off, opening the converter clutch when impeller speed reaches a speed required for a transmission pump, connected to an impeller, to produce line pressure at a desired magnitude.

Regenerative braking torque blend-out and torque converter clutch control is coordinated such that recovery of vehicle kinetic energy can be maximized during a regeneration braking event.

The method coordinates torque converter clutch operation and regenerative braking by arbitrating a trade-off between fuel economy improvement and driveability attributes.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
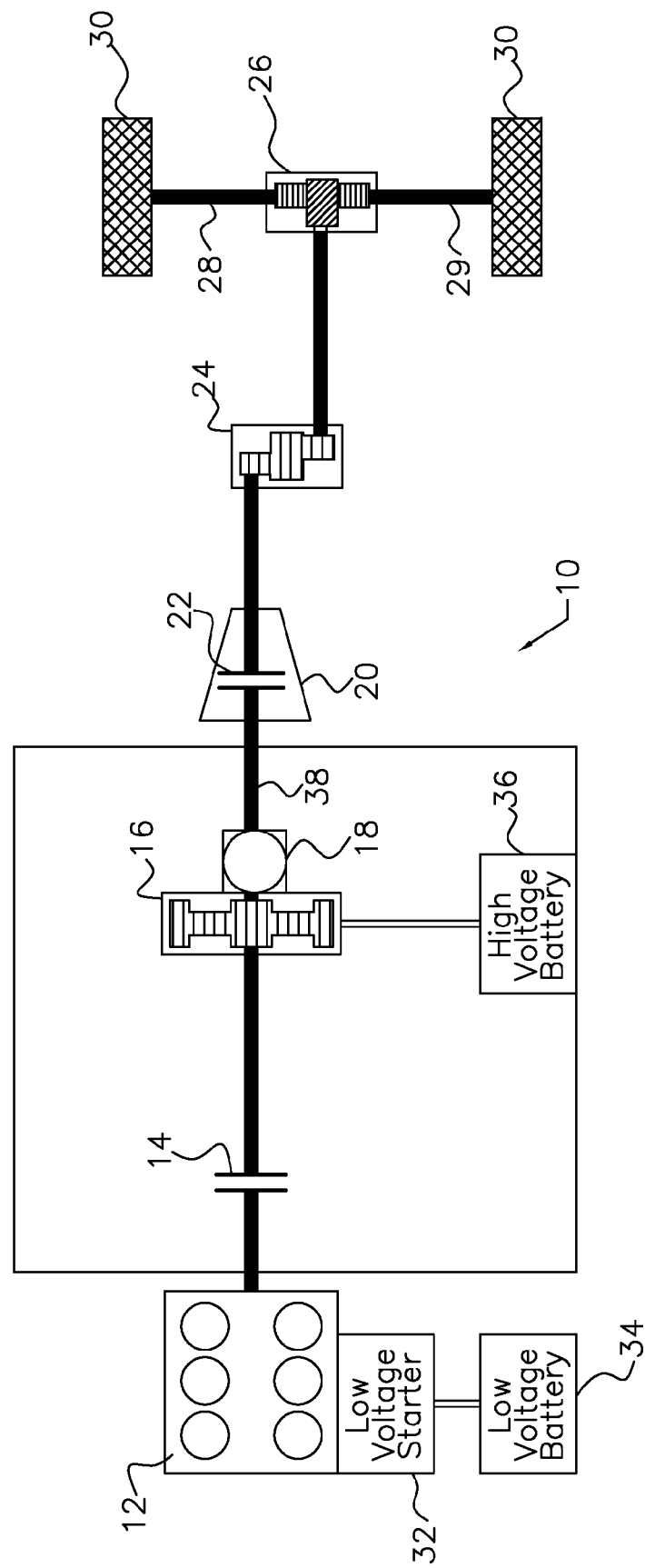
FIG. 1 is a schematic diagram showing a modular hybrid electric powertrain for a motor vehicle.

Referring first to FIG. 1, a parallel hybrid electric powertrain 10 includes an internal combustion engine 12, engine disconnect clutch 14, electric machine or motor/generator 16, transmission hydraulic pump 18, torque converter 20, torque converter lock-up clutch 22, transmission gearing 24, final drive gearing 26, shafts 28, 29, and driven wheels 30. A low voltage starter 32, powered by a low voltage battery 34, cranks the engine while starting the engine 12 and producing sustained combustion. A high voltage battery 36 powers the electric motor/generator 16.

The torque converter 20 is a hydraulic coupling that produces a hydrokinetic drive connection between an impeller, which is driveably connected to the engine 12 when clutch 14 is closed, and a turbine, which is driveably connected to the driven wheels 30.

The torque converter lock-up clutch 22 alternately opens and closes a drive connection between the torque converter's turbine and the shaft 38.

A vehicle equipped with this powertrain 10 can produce electric drive and hybrid electric drive and can charge the battery 36 either by regenerative braking, i.e., recovering and converting kinetic energy of the vehicle during a braking event to electric energy that can be stored in battery 36, or by using the engine to charge battery 36.

The fuel economy benefit in a hybrid electric vehicle results mainly from its ability to perform regenerative braking. In powertrain 10 motor 16 is coupled to the wheels through the torque converter 20, transmission gearing 24 and final drive 26. The torque converter 20 transmits torque through the combination of the hydraulic path and the mechanic path, provided the torque converter clutch 22 is slipping. If the torque converter clutch 22 is fully open, torque can only be transmitted through the hydraulic path. If the clutch 22 is fully locked, the torque can only be transmitted through the mechanical path.

During regenerative braking, torque is transmitted from the wheels 30 to the electric machine 16. If clutch 22 is open, the torque converter's ability to transmit torque in the reverse direction is very limited. Any excessive regenerative torque can reduce the electric machine's speed. As a result, to recoup most of the kinetic energy using regenerative braking, the torque converter clutch 22 should be kept locked while the vehicle is slowing down.

The torque converter clutch 22, however, must be opened for various reasons. When impeller speed is low, clutch 22 must be open so that the engine 12 does not stall. When clutch 22 is open, the hydraulic path serves as coupling to deliver torque smoothly to the wheels 30.

The control strategy coordinates operation of the torque converter clutch 22 and the electric machine 16 during a vehicle braking event, whether engine 12 is running or the engine is stopped. If engine 12 is running, its crankshaft is connected to the electric machine 16; therefore, the torque converter's impeller speed can not drop below the engine idle speed. If engine 12 is stopped, the electric machine 16 can be running at speeds lower than the nominal engine idle speed. If the transmission's hydraulic system line pressure is provided by the mechanical oil pump 18, the minimal impeller speed should be determined by the minimal pressure that the pump should generate in this case.

Figure 2:
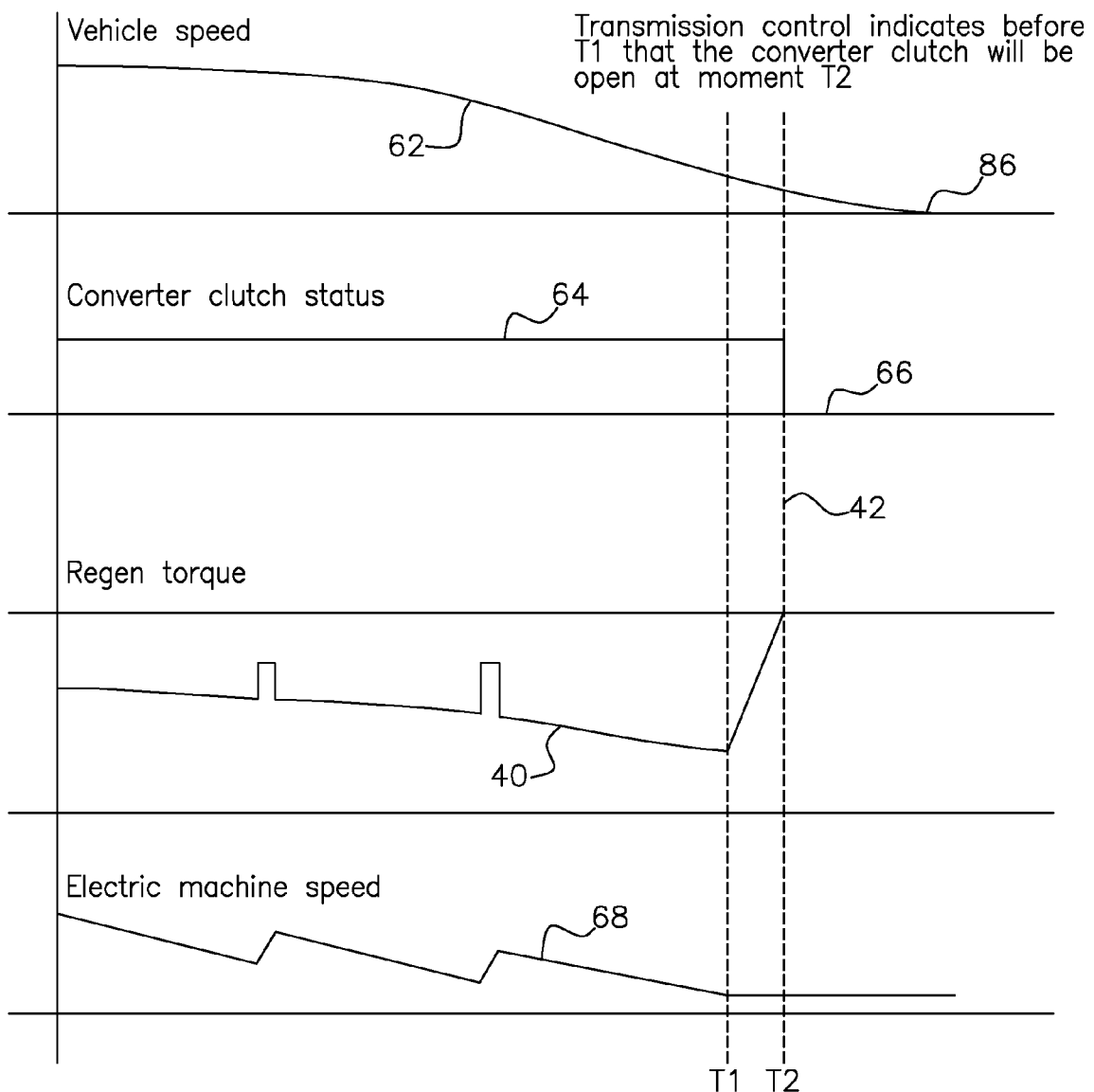
FIG. 2 shows graphs representing the variation of various powertrain parameters during a regenerative braking event.

As shown in FIG. 2, the regenerative braking torque decreases along a ramp 40 before clutch 22 is open at 42. In FIG. 2, converter clutch is closed at 64 and open at 66, and the speed 68 of electric machine 16 varies while vehicle speed 62 declines during regenerative braking.

Figure 3:
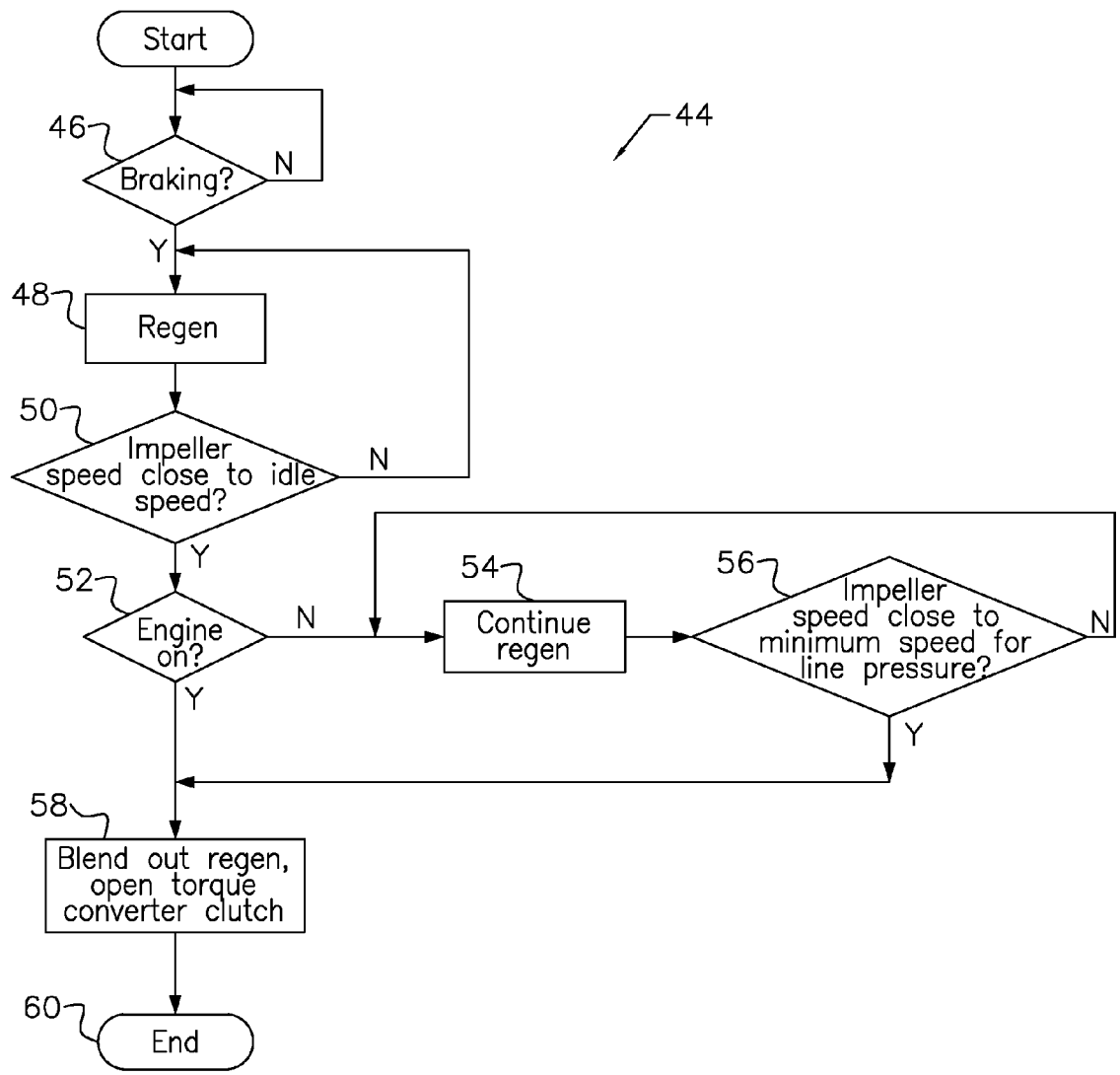
FIG. 3 is an algorithm for coordinating torque converter clutch operation and regenerative braking.

An algorithm 44 shown in FIG. 3 controls and coordinates torque converter clutch operation and regenerative braking. At step 46 a test is performed to determine whether vehicle wheel braking is currently occurring. If the result of test 46 is logically false, control returns to step 46.

If the result of test 46 is logically true, regenerative braking is started at step 48.

At step 50 a test is performed to determine whether the impeller speed of torque converter 20 is close to engine idle speed, i.e., within a range of about 50 rpm to 100 rpm of engine idle speed. The range is calibratable, i.e., can be adjusted for particular vehicles and vehicle components and applications. The speed range avoids delay and the risk of impeller speed and engine idle speed not matching exactly due to noise factors in the system. A speed range that is too large can cause a noticeable disturbance.

If the result of test 50 is false, control returns to step 48.

If the result of test 50 is true, at step 52 a test is performed to determine whether engine 12 is running. If the result of test 52 is false, at step 54 regenerative braking continues.

At step 56 a test is performed to determine whether impeller speed is close to a minimum speed required for the pump 18 to produce a required magnitude of transmission hydraulic system line pressure, i.e., within about 250 rpm to 350 rpm depending on the transmission and its components. The range is calibratable, i.e., can be adjusted for particular vehicles and vehicle components and applications. Impeller speed should not be less than a minimum speed required for desired line pressure.

If the result of test 56 is false, control returns to step 54.

If the result of test 56 is true, at step 58 regenerative braking torque is blended-out along ramp 40, and the torque converter clutch 22 is opened at 42.

Execution of algorithm 44 ends at step 60.

If the engine is running, the opening of clutch 22 is scheduled at 42, the lowest possible vehicle speed 62 while the impeller speed is above the engine idle speed, taking drivability into consideration. If the engine is stopped during the braking event, opening of clutch 22 is delayed until the impeller speed is just above the minimal speed sufficient to provide hydraulic line pressure to the transmission, usually about 400 rpm.

The powertrain 10 may include an auxiliary oil pump, i.e., a hydraulic pump that is driven by an electric motor, sometimes called an e-pump, which is a substitute for the transmission pump 18 of FIG. 1. An e-pump is turned on to maintain the transmission line pressure and clutch 22 is kept closed as the vehicle comes to a stop.

Figure 4:
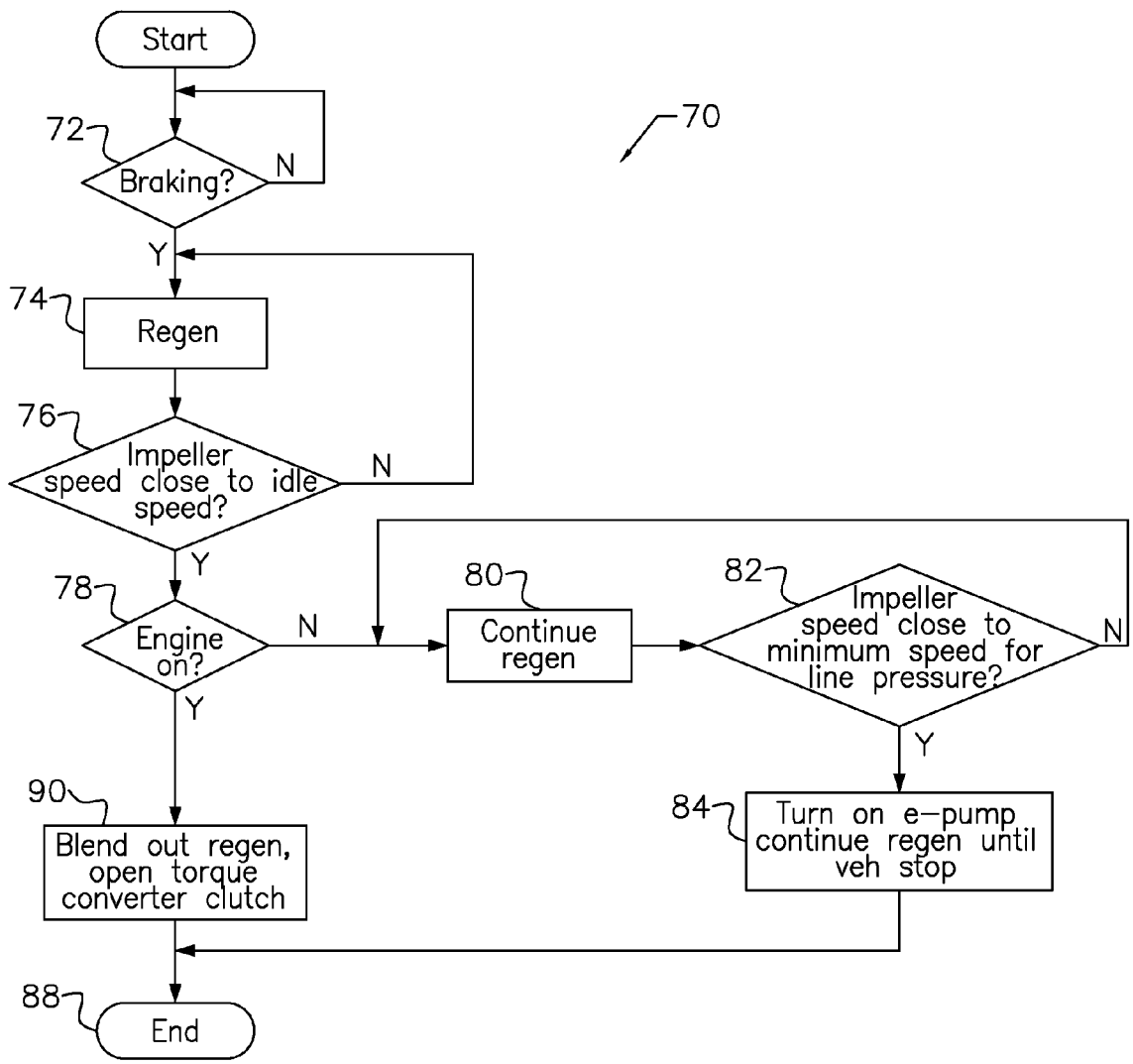
FIG. 4 is an alternative algorithm for coordinating torque converter clutch operation and regenerative braking of a powertrain having an e-pump.

FIG. 4 shows an algorithm 70, which controls an e-pump. At step 72 a test is performed to determine whether vehicle wheel braking is currently occurring. If the result of test 72 is false, control returns to step 72.

If the result of test 72 is true, regenerative braking is started at step 74.

At step 76 a test is performed to determine whether the impeller speed of torque converter 20 is close to engine idle speed, i.e., within a range of about 50 rpm to 100 rpm of engine idle speed. The range is calibratable, i.e., can be adjusted for particular vehicles and vehicle components and applications. The speed range avoids delay and the risk of impeller speed and engine idle speed not matching exactly due to noise factors in the system. A speed range that is too large can cause a noticeable disturbance.

If the result of test 76 is false, control returns to step 74.

If the result of test 76 is true, at step 78 a test is performed to determine whether engine 12 is running. If the result of test 78 is false, at step 80 regenerative braking continues.

At step 82 a test is performed to determine whether impeller speed is close to a minimum speed required for the pump 18 to produce a required magnitude of transmission hydraulic system line pressure, i.e., within about 250 rpm to 350 rpm depending on the transmission and its components. The range is calibratable, i.e., can be adjusted for particular vehicles and vehicle components and applications. Impeller speed should not be less than a minimum speed required for desired line pressure.

If the result of test 82 is true, at step 84 the e-pump is turned on, regenerative braking continues until the vehicle speed stops at 86, and execution of algorithm 70 ends at step 88.

If the result of test 78 is true, at step 90 regenerative braking torque is blended-out along ramp 40, the torque converter clutch 22 is opened at 42, and execution of algorithm 70 ends at step 88.

If the engine is running, the opening of clutch 22 is scheduled at 42, the lowest possible vehicle speed 62 while the impeller speed is above the engine idle speed, taking drivability into consideration. If the engine is stopped during the braking event, opening of clutch 22 is delayed until the impeller speed is just above the minimal speed sufficient to provide hydraulic line pressure to the transmission, usually about 400 rpm.

In accordance with the provisions of the patent statutes, the preferred embodiment has been described. However, it should be noted that the alternate embodiments can be practiced otherwise than as specifically illustrated and described.

The invention claimed is:

1. A method for controlling vehicle regenerative braking, comprising:
   (a) maintaining a converter clutch closed while vehicle wheel braking;
   (b) while an engine connected to an impeller is running, opening the converter clutch provided an impeller speed reaches a reference speed difference relative to engine idle speed;
   (c) while the engine is off, opening the converter clutch provided the impeller speed reaches a speed required for a transmission pump, connected to an impeller, to produce line pressure at a desired magnitude.

2. The method of claim 1, wherein steps (b) and (c) each further comprises adjusting a torque transmitting capacity of the converter clutch to reduce a magnitude of regeneration torque transmitted to an electric generator through the converter clutch before opening the converter clutch.

3. The method of claim 1, wherein step (a) further includes allowing a regenerative braking torque to decrease while maintaining the converter clutch closed.

4. The method of claim 1, wherein step (b) further includes opening the converter clutch provided impeller speed reaches a reference speed greater than engine idle speed.

5. The method of claim 1, wherein step (b) further includes opening the converter clutch provided impeller speed is within a reference speed range greater than engine idle speed.

6. The method of claim 1, wherein step (c) further includes opening the converter clutch provided impeller speed reaches a reference speed greater than a speed required for the transmission pump to produce the line pressure at a desired magnitude.

7. The method of claim 1, wherein step (c) further includes opening the converter clutch provided impeller speed reaches a reference speed range greater than a speed required for the transmission pump to produce the line pressure at a desired magnitude.

8. A method for controlling vehicle regenerative braking, comprising:
 (a) maintaining a converter clutch closed while vehicle wheel braking;
 (b) while an engine connected to an impeller is running, opening the converter clutch provided an impeller speed reaches a reference speed difference relative to engine idle speed;
 (c) while the engine is off, running an electrically-driven pump until vehicle speed stops.

9. The method of claim 8, wherein step (b) further comprises adjusting a torque transmitting capacity of the converter clutch to reduce a magnitude of regeneration torque transmitted to an electric generator through the converter clutch before opening the converter clutch.

10. The method of claim 8, wherein step (a) further includes allowing a regenerative braking torque to decrease while maintaining the converter clutch closed.

11. The method of claim 8, wherein step (b) further includes opening the converter clutch provided impeller speed reaches a reference speed greater than engine idle speed.

12. The method of claim 8, wherein step (b) further includes opening the converter clutch provided impeller speed reaches a reference speed range greater than engine idle speed.

\* \* \* \* \*